United States Patent Office 3,078,247
Patented Feb. 19, 1963

3,078,247
STABLE AQUEOUS EMULSIONS OF ELASTOMERIC CHLOROPRENE COPOLYMERS CONTAINING ZINC OXIDE
Gustav Sinn, Bergisch-Neukirchen, and Rosahl Dietrich and Heinz Esser, Koln-Stammheim, Germany, assignors to Farbenfabriken Bayer Aktiengesellschaft, Leverkusen, Germany, a corporation of Germany
No Drawing. Filed Dec. 15, 1959, Ser. No. 859,555
Claims priority, application Germany Dec. 19, 1958
4 Claims. (Cl. 260—29.7)

The present invention relates to aqueous emulsions of elastomeric chloroprene copolymers which are suitable for the production of shaped elements.

It is known that vulcanising agents, such as sulphur or zinc oxide and vulcanisation accelerators must be added to the aqueous emulsions of synthetic elastomers, for example aqueous emulsions of polymers of butadiene or its copolymers with styrene or acrylonitrile for the purpose of producing elastic films. The films produced from the latices are usually subjected to a vulcanisation process which requires a relatively long time and relatively high temperatures. It is only by this vulcanisation process that the films are given their optimum properties, such as for example high tearing strength, good elasticity, low abrasion and good resistance to oils and other chemicals. It is also known to cross-link synthetic elastomers containing carboxyl groups with zinc oxide or other oxides of polyvalent metals by these components being mixed and heated to temperatures higher than 50° C. According to the known processes, however, vulcanisates are obtained which do not satisfy all requirements as regards their resistance to weather influences and ozone or their resistance to heat and chemicals.

The present invention is now concerned with an aqueous emulsion of synthetic elastomer which is suitable for the production of cross-linking agents, the synthetic elastomers consisting of a copolymer of 2-chlorobutadi-1,3-ene (chloroprene), an $\alpha,\beta$-ethylene carboxylic acid and an additional monomer which is capable of being copolymerised with the said components.

Examples of ethylene carboxylic acids for the production of the said elastomers, are $\alpha,\beta$-ethylenically unsaturated monocarboxylic acids, such as for example acrylic acid, methacrylic acid, as well as semiesters of fumaric or maleic acid with saturated monohydric alcohols containing 1 to 18 carbon atoms, such as methanol, propanol, hexanol, cyclohexanol, dodecanol, octadecanol, furthermore $\alpha,\beta$-ethylene dicarboxylic acids or their anhydrides, such as for example fumaric acid and maleic anhydride. These carboxylic acids are advantageously incorporated by polymerisation in quantities of ½ to 10% by weight into the said elastomers.

Suitable as other copolymerisation components for the production of the elastomers are conjugated diolefines, such as for example butadiene, isoprene, dichlorobutadiene, as well as monovinyl compounds which are free from carboxyl groups, such as styrene and acrylonitrile. These copolymerisation components are advantageously used in quantities from about 2 to 10%, calculated on the total monomers. Particularly suitable as cross-linking agent is zinc oxide. Further suitable agents are calcium oxide, barium oxide, strontium oxide, magnesium oxide, cadmium oxide, tin oxide, dibutyl-tin oxide or hydrates thereof. It is advisable to add these cross-linking agents to the aqueous emulsions in quantities of about 2 to 10% by weight, calculated on the aforesaid copolymers.

For the production of the copolymers, the said components are emulsified in an aqueous medium with the aid of the usual emulsifiers and polymerised in the presence of radical-forming catalysts, such as for example per compounds (peroxides, hydroperoxides, per acids) at pH values from about 3 to 6. Redox systems such as for example combinations of formamidinesulphinic acid with molecular oxygen or with persulphates are also suitable as catalysts. In this way, copolymers of chloroprene are obtained which can be satisfactorily cross-linked with the said oxides. It is especially to be emphasised in this connection that the films are already cross-linked in the manner of vulcanisation after being dried at room temperature. This discovery is surprising, since polymers which are composed only of chloroprene and methacrylic acid as polymerisation components do not produce a reproducible cross-linking with metal oxides.

Furthermore, polymerisation mixtures containing a third copolymerisation component of the type described have the advantage that the polymerisation proceeds surprisingly uniformly and in a readily controllable manner, whereas mixtures containing only chloroprene and methacrylic acid polymerise in an extremely violent manner with strong heat of reaction, so that they are difficult to control. In addition, when chloroprene and methacrylic acid are used alone, the major part of the methacrylic acid is not incorporated into the copolymer, but polymerises independently with formation of polymethacrylic acid.

The zinc oxide or other oxides of polyvalent metals are preferably introduced into the said copolymer emulsion by the said emulsion being adjusted by means of ammonia or other compounds with an alkali action to a pH value of about 6 to 6.5 and by adding to the emulsion a nonionic stabiliser, such as for example a polyalkylene oxide derivative, in quantities of 1 to 5% by weight, calculated on the copolymer. For facilitating the incorporation of the metal oxides into the said emulsions, they are preferably dispersed beforehand by means of an aqueous solution of a dispersing agent, such as for example sodiummethylene-bis-naphthalene sulphonate.

The emulsions according to the invention are excellently suitable for the production of films and impregnations on very different materials, such as for example textiles, paper and leather. As already mentioned above, they have the surprising property that after they have been applied to the support and after the water has evaporated, they cross-link at room temperature. However, it is of course also possible to accelerate the cross-linking by using elevated temperatures. The films obtained from these emulsions are further characterised by exceptionally good resistance to weather influences, and also good resistance to heat and chemicals, while at the same time they approach the vulcanisates of natural rubber as regards elasticity properties and physical values.

In the following examples, the parts indicated are parts by weight.

EXAMPLE 1

(a) 100 parts of water, 3 to 5 parts of surface-active paraffin sulphonate (emulsifier) and 0.5 part of sodium pyrophosphate are stirred in a pressure-tight vessel with 96 parts of chloroprene, which has been freed by way of an acid-activated bleaching earth column from the stabiliser, for example phenthiazine, and is heated, together with 4 parts of methacrylic acid and 0.5 part of n-dodecylmercaptan, to a temperature of 40° C. Polymerisation starts after adding 0.0005 part of potassium persulphate.

With a conversion of 80%, the reaction is stopped by adding 1 to 2 parts of bis-(2-hydroxy-3-cyclohexyl-5-methylphenyl)-methane, which are dissolved in 1 to 2 parts of chloroprene and emulsified with 2 to 4 parts of a 2% emulsifier solution.

The latex has gas removed therefrom in a stirrer-type vessel and it is concentrated to a solid content of about 48%.

(b) If the 96 parts of monomeric chloroprene mentioned in Example a are replaced by 91 parts of monomeric chloroprene and 5 parts of butadiene and if the procedure is in other respects the same as that described under a, a latex is obtained which has been prepared with the polymerisation speeds indicated in Table I. For comparison purposes, the table includes the polymerisation speeds of the latex according to Example a. It will clearly be seen that the addition of butadiene has considerably lowered the polymerisation speed, and experience shows that this produces a more uniform polymer structure with the monomers having very different polymerisation speeds such as chloroprene and methacrylic acid.

*Table I*

[Latex according to Ex. 1a]

| Methacrylic acid content, percent | Butadiene content, percent | Operating time, hours | Yield g. of solid rubber in 100 g. of latex |
|---|---|---|---|
| 4 | 0 | 0 | 0 |
|  |  | 1 | 32 g. |
|  |  | 2 | 40 g. |
|  |  | 3 | 43 g. |
|  |  | 3½ | 44 g.=80% yield |

[Latex according to Ex. 1b]

| 4 | 5 | 0 | 0 |
|---|---|---|---|
|  |  | 1 | 21.5 g. |
|  |  | 2 | 29 g. |
|  |  | 3 | 32 g. |
|  |  | 4 | 34 g. |
|  |  | 5 | 40 g. |
|  |  | 6 | 42 g. |
|  |  | 7 | 44 g.=80% yield |

After zinc oxide has been added to the latex obtained according to Example 1a and after it has been cast to form a film with a thickness of approximately 0.8 mm., it is not possible for this latex to be cross-linked in a satisfactorily reproducible manner at room temperature or even at higher temperatures (up to 110° C.). The reason for this is to be found in the non-uniform polymer structure (see Table II). In contrast hereto, when operating in the same manner with the latex of Example 1b, there are obtained the strength values which are indicated in Table II and which can be satisfactorily reproduced, and these strength values are to be attributed to a uniform cross-linking. For latices containing ZnO, 5 g. of ZnO were used to 100 g. of copolymer. The values for the tearing strength (kg./cm.²) are given under F and the values for elongation (percent) are given under D.

*Table II*

| Vulcan. in hot air at 100° C. | Latex according to Table I, Ex. 1a | | | | Latex according to Table I, Ex. 1b | | | |
|---|---|---|---|---|---|---|---|---|
|  | Latex without zinc oxide | | Latex with ZnO | | Latex without zinc oxide | | Latex with zinc oxide | |
|  | F | D | F | D | F | D | F | D |
| 0' | 87 | 950 | 92 | 880 | 95 | 1,470 | 187 | 870 |
| 20' | 93 | 940 | 94 | 870 | 98 | 1,340 | 192 | 970 |
| 35' | 100 | 930 | 97 | 860 | 100 | 1,320 | 197 | 880 |
| 40' | 100 | 930 | 100 | 845 | 100 | 1,310 | 200 | 870 |
| 50' | 104 | 890 | 107 | 840 | 108 | 1,250 | 210 | 860 |
| 60' | 108 | 830 | 108 | 790 | 118 | 1,210 | 210 | 850 |
| 100' | 110 | 800 | 110 | 750 | 128 | 1,200 | 212 | 820 |

EXAMPLE 2

If the 96 parts of monomeric chloroprene indicated in Example 1 are replaced by 93.5 parts of chloroprene and 2.5 parts of butadiene and if the procedure adopted is in other respects as previously described, there is obtained a latex which cross-links satisfactorily with zinc oxide and which provides the following strength values:

*Table III*

| Vulcan. in hot air at 100° C. | Latex without zinc oxide | | Latex with zinc oxide | |
|---|---|---|---|---|
|  | F | D | F | D |
| 0' | 100 | 1,370 | 115 | 960 |
| 20' | 100 | 1,165 | 128 | 920 |
| 35' | 100 | 1,320 | 135 | 890 |
| 40' | 106 | 1,300 | 147 | 830 |
| 50' | 95 | 1,390 | 146 | 850 |
| 60' | 110 | 1,310 | 139 | 820 |
| 100' | 108 | 1,320 | 120 | 760 |

EXAMPLE 3

If the 96 parts of monomeric chloroprene indicated in Example 1 are replaced by 86 parts of chloroprene and 10 parts of butadiene and if the procedure followed is in other respects as previously described, there is obtained a latex which can be satisfactorily cross-linked with zinc oxide and which gives the following strength values:

*Table IV*

| Vulcan. in hot air at 100° C. | Latex without zinc oxide | | Latex with zinc oxide | |
|---|---|---|---|---|
|  | F | D | F | D |
| 0' | 51 | 1,540 | 88 | 980 |
| 20' | 63 | 1,500 | 109 | 940 |
| 35' | 51 | 1,460 | 115 | 920 |
| 40' | 63 | 1,460 | 119 | 920 |
| 50' | 65 | 1,450 | 118 | 895 |
| 60' | 92 | 1,435 | 118 | 865 |
| 100' | 75 | 1,410 | 120 | 810 |

EXAMPLE 4

If the 96 parts of monomeric chloroprene indicated in Example 1 are replaced by 91 parts of chloroprene and 5 parts of acrylonitrile and if the procedure in other respects is as previously described, a latex is obtained which can be cross-linked satisfactorily with zinc oxide and which has the following strength values:

*Table V*

| Vulcan. in hot air at 100° C. | Latex without zinc oxide | | Latex with zinc oxide | |
|---|---|---|---|---|
|  | F | D | F | D |
| 0' | 42 | 1,540 | 134 | 880 |
| 20' | 83 | 1,140 | 140 | 860 |
| 35' | 87 | 1,100 | 144 | 840 |
| 40' | 93 | 1,050 | 146 | 830 |
| 50' | 97 | 1,010 | 148 | 820 |
| 60' | 98 | 1,010 | 150 | 820 |
| 100' | 114 | 1,000 | 126 | 815 |

EXAMPLE 5

If the 96 parts of monomeric chloroprene indicated in Example 1 are replaced by 91 parts of chloroprene and 5 parts of dichlorobutadiene and if the procedure in other respects is as previously described, a latex is obtained which can be satisfactorily cross-linked with zinc oxide and which has the following strength values:

Table VI

| Vulcan. in hot air at 100° C. | Latex without zinc oxide | | Latex with zinc oxide | |
|---|---|---|---|---|
| | F | D | F | D |
| 0' | 57 | 1,385 | 120 | 910 |
| 20' | 67 | 1,375 | 128 | 925 |
| 35' | 74 | 1,335 | 134 | 905 |
| 40' | 80 | 1,320 | 140 | 865 |
| 50' | 85 | 1,260 | 140 | 845 |
| 60' | 92 | 1,240 | 135 | 805 |
| 100' | 75 | 1,210 | 120 | 760 |

EXAMPLE 6

If the 96 parts of monomeric chloroprene indicated in Example 1 are replaced by 91 parts of chloroprene and 5 parts of dichlorobutadiene and if the procedure in other respects is as previously described, a latex is obtained which can be satisfactorily cross-linked with zinc oxide and which has the following strength values:

Table VII

| Vulcan. in hot air at 100° C. | Latex without zinc oxide | | Latex with zinc oxide | |
|---|---|---|---|---|
| | F | D | F | D |
| 0' | 109 | 1,200 | 149 | 890 |
| 20' | 114 | 1,160 | 157 | 910 |
| 35' | 113 | 1,120 | 160 | 830 |
| 40' | 113 | 1,100 | 174 | 820 |
| 50' | 120 | 1,100 | 184 | 810 |
| 60' | 124 | 1,080 | 180 | 790 |
| 100' | 120 | 1,020 | 160 | 750 |

What is claimed is:

1. Process for the production of a stable aqueous emulsion of a synthetic elastomer which is suitable for the production of cross-linked shaped elements which comprises adding zinc oxide and a non-ionic stabilizer to an aqueous emulsion of a copolymer of chloroprene, an alpha,beta-ethylene-carboxylic acid, and an olefinically unsaturated monomer which is copolymerizable therewith, said chloroprene being incorporated in said copolymer in a higher amount by weight than the sum of the other two said monomers, the addition of zinc oxide being made after adjusting said aqueous emulsion to a pH value of about 6 to 6.5, the amount of zinc oxide being 2 to 10% based on the amount of the emulsion, and the amount of non-ionic stabilizer added being 1 to 5% by weight based on the copolymer.

2. The process of claim 1 wherein said synthetic elastomer is a copolymer of 80 to 97.5 percent by weight of chloroprene, 0.5 to 10 percent by weight of an alpha, beta-ethylenically unsaturated monocarboxylic acid, and 2 to 10 percent by weight of a monomer selected from the group consisting of an additional conjugated diolefin having 4 to 6 carbon atoms, styrene and acrylonitrile.

3. A stable aqueous emulsion of a synthetic elastomer which is suitable for the production of cross-linked shaped elements which contains 2 to 10 percent by weight, based on the total amount of emulsion, of zinc oxide as a cross-linking agent, 1 to 5 percent, based on the copolymer, of a non-ionic emulsifier, and a synthetic elastomer which is a copolymer of chloroprene, an alpha,beta-ethylene-carboxylic acid, and an additional olefinically unsaturated monomer which is copolymerizable therewith, the chloroprene content of said copolymer being higher, in amount by weight, than the sum of the other two said monomers, said emulsion having a pH value of about 6 to 6.5.

4. The aqueous emulsion of claim 3 wherein said synthetic elastomer is a copolymer of 80 to 97.5 percent by weight of chloroprene, 0.5 to 10 percent by weight of an alpha,beta-ethylenically unsaturated monocarboxylic acid, and 2 to 10 percent by weight of a monomer selected from the group consisting of an additional conjugated diolefin having 4 to 6 carbon atoms, styrene and acrylonitrile.

References Cited in the file of this patent

UNITED STATES PATENTS 2,710,292 Brown _____ June 7, 1955
2,859,193 Kowalewski _____ Nov. 4, 1958
2,959,821 Kolb _____ Nov. 15, 1960

OTHER REFERENCES

Brown et al.: "Rubber World," volume 130, No. 6, September 1954, pages 784–788.